(12) United States Patent
He

(10) Patent No.: US 11,503,671 B2
(45) Date of Patent: Nov. 15, 2022

(54) TEMPERATURE CONTROLLER FOR ELECTRONIC SMOKING DEVICE

(71) Applicant: DONGGUAN MYSMOK ELECTRONIC TECHNOLOGY CO., LTD, Dongguan (CN)

(72) Inventor: Liqing He, Dongguan (CN)

(73) Assignee: DONGGUAN MYSMOK ELECTRONIC TECHNOLOGY CO., LTD., Dongguan (CN)

( * ) Notice: Subject to any disclaimer, the term of this patent is extended or adjusted under 35 U.S.C. 154(b) by 554 days.

(21) Appl. No.: 16/574,356

(22) Filed: Sep. 18, 2019

(65) Prior Publication Data

US 2020/0008482 A1 Jan. 9, 2020

Related U.S. Application Data

(63) Continuation-in-part of application No. PCT/CN2017/077759, filed on Mar. 22, 2017.

(51) Int. Cl.
*A24F 40/57* (2020.01)
*H05B 1/02* (2006.01)
*G05B 13/02* (2006.01)

(52) U.S. Cl.
CPC ........... *H05B 1/0297* (2013.01); *A24F 40/57* (2020.01); *G05B 13/024* (2013.01)

(58) Field of Classification Search
CPC .................................................... A24F 40/57
See application file for complete search history.

(56) References Cited

U.S. PATENT DOCUMENTS

| 5,591,368 | A | * | 1/1997 | Fleischhauer | A24F 40/46 |
| | | | | | 131/194 |
| 2010/0163063 | A1 | * | 7/2010 | Fernando | A24F 40/85 |
| | | | | | 131/330 |
| 2011/0120482 | A1 | | 5/2011 | Brennelse | |
| 2014/0261408 | A1 | | 9/2014 | DePiano et al. | |

(Continued)

FOREIGN PATENT DOCUMENTS

| CN | 202003906 U | 10/2011 |
| CN | 203643774 U | 6/2014 |
| CN | 104323428 A | 2/2015 |

(Continued)

*Primary Examiner* — Cynthia Szewczyk
(74) *Attorney, Agent, or Firm* — Shimokaji IP

(57) ABSTRACT

A temperature controller for electronic smoking device includes a metal heating sheet for heating a cigarette and a controller for controlling temperature of the heating sheet by collecting a real-time resistance of the heating sheet. The power drive unit is electrically connected to a power source and the heating sheet respectively, the control unit is electrically connected to the power drive unit and the real-time resistance detection unit respectively, and the analog-to-digital conversion unit is configured to convert an analog signal output by the real-time resistance detection unit into a digital signal that is transmitted to the control unit. The real-time resistance detection unit is configured to detect a real-time resistance of the heating sheet, and the control unit is configured to adjust an output power of the power drive unit according to the real-time resistance of the heating sheet. The controller realizes precise temperature control and convenient operation.

6 Claims, 3 Drawing Sheets

(56) References Cited

U.S. PATENT DOCUMENTS

2014/0270727 A1    9/2014  Ampolini et al.
2018/0043114 A1*   2/2018  Bowen .................... A24F 40/60

FOREIGN PATENT DOCUMENTS

| CN | 104323431 | A |   | 2/2015  |   |           |
|----|-----------|---|---|---------|---|-----------|
| CN | 104839896 | A |   | 8/2015  |   |           |
| CN | 104881063 | A |   | 9/2015  |   |           |
| CN | 105011375 | A |   | 11/2015 |   |           |
| CN | 204742630 | U |   | 11/2015 |   |           |
| CN | 205491202 | U |   | 8/2016  |   |           |
| CN | 205757216 | U |   | 12/2016 |   |           |
| CN | 106307614 | A |   | 1/2017  |   |           |
| CN | 106339026 | A |   | 1/2017  |   |           |
| CN | 106858724 | A |   | 6/2017  |   |           |
| CN | 206760774 | U |   | 12/2017 |   |           |
| JP | 2000041654 | A |  | 2/2000  |   |           |
| WO | WO-2015089711 | A | * | 6/2015 | ............. | A24F 40/30 |

* cited by examiner

TEMPERATURE CONTROLLER FOR ELECTRONIC SMOKING DEVICE

RELATED APPLICATIONS

This is a Continuation-in-Part of PCT application No. PCT/CN2017/077759, filed Mar. 22, 2017.

FIELD OF THE INVENTION

The present invention relates to an electronic smoking device, and more particularly to a temperature controller for electronic smoking device by using a metal heating sheet to keep a constant temperature.

BACKGROUND OF THE INVENTION

Although everyone knows that smoking is harmful to health, for now, the number of smokers worldwide is more than one-fifth of the total population. This is because people have formed a habit of smoking, and it is difficult to get rid of it. In response to this situation, an electronic smoking device was developed, which heats, rather than burns the tobacco so as to provide aromas with nicotine and tobacco characteristic to consumers, in such a way, the smoking needs of smokers are met, and meanwhile the release of tar and harmful substances in mainstream smoke is greatly reduced. Since the tobacco will not be heated during the interval of smoking, thus the harm of second-hand smoke is greatly reduced, thus the electronic smoking device is the mainstream trend of the future development in the tobacco market.

A heating sheet used in the current electronic smoking appliances are generally made of ceramics, and the temperature of the heating sheet is detected by one or more temperature sensors so as to achieve temperature control. However, in the electronic smoking device, there is a certain error between the detected temperature and the actual temperature of the ceramic heating sheet, causing the rough temperature adjustment to affect the taste of the consumer. Secondly, the hardness of the ceramic heating sheet is not large enough to clean the redundant tobacco rested on the heating sheet.

Therefore, there is a need in the market for an electronic smoking appliance that can accurately control the temperature and maintain a constant temperature, and the heating sheet is easy to clean, to overcome the above drawbacks.

SUMMARY OF THE INVENTION

One objective of the present invention is to provide a temperature controller for electronic smoking device by using a metal heating sheet, which can realize precise temperature control, maintain a working state with constant temperature, and is easy to clean.

To achieve the mentioned above objective, the present invention provides a temperature controller for electronic smoking device comprising a metal heating sheet for heating a cigarette and a controller for controlling temperature of the heating sheet by collecting a real-time resistance of the heating sheet.

In comparison with the prior art, the temperature controller for electronic smoking device disclosed in the present application uses a heating sheet made of a metal material, instead of using a temperature sensor to sense the ambient temperature around the heating sheet in the prior art, the actual temperature of the heating sheet according to the present invention can be determined by detecting the resistance value of the metal heating sheet since the resistivity of the metal material has a good linear proportional relationship with the temperature. After obtaining the actual temperature of the heating sheet, precise control of the operating temperature of the heating sheet can be achieved, and the temperature is accurate, the stability of the product and the reliability are high, so that it can be precisely adjusted according to different tastes of the consumer (different temperature corresponds to a different taste). Secondly, since the thermal conductivity of the metal is much better than that of the ceramic, the electronic smoking device using the metal heating sheet of the present application has a short waiting time for reaching the desired temperature, which can be controlled within 5 seconds. Moreover, the use of a metal material as a heating sheet has the advantages of simple structure, convenient manufacture, strong hardness, environmental sanitation, and cost saving.

Preferably, the controller includes a power drive unit, an analog-to-digital conversion unit, a control unit and a real-time resistance detection unit.

Preferably, the power drive unit is electrically connected to a power source and the heating sheet respectively, the control unit is electrically connected to the power drive unit and the real-time resistance detection unit respectively, and the analog-to-digital conversion unit is configured to convert an analog signal output by the real-time resistance detection unit into a digital signal that is transmitted to the control unit.

The real-time resistance detection unit is configured to detect a real-time resistance of the heating sheet, and the control unit is configured to adjust an output power of the power drive unit according to the real-time resistance of the heating sheet.

Under the control of the control unit, the power drive unit converts the energy of the power source into the energy required for the heating sheet, thereby achieving precise temperature control and protecting the metal heating sheet from being burnt.

Preferably, the control unit is configured to adjust the output power of the power drive unit by outputting pulse width modulated waves with different duty ratios. By using PWM waves, the control unit modulates the power drive unit, with small harmonics, fast dynamic response, high power factor of the power supply, relatively simple control circuit, and low cost and strong resistance to noise.

Preferably, the real-time resistance detection unit uses a voltage comparison method to detect the real-time resistance of the heating sheet.

Preferably, the real-time resistance detection unit comprises a first voltage comparison circuit for detecting a heater sheet voltage, and a second voltage comparison circuit that is connected with the first voltage comparison circuit in series for generating a comparison voltage that is compared with the heater sheet voltage.

Preferably, the first voltage comparison circuit comprises a first voltage divider resistor and a second voltage divider resistor connected in series, one end of the first voltage divider resistor and the second voltage divider resistor is grounded, and the other end is connected to a positive terminal of the heating sheet, the heater sheet voltage is output from a connection junction of the first voltage divider resistor and the second voltage divider resistor, and then is output from the analog-to-digital conversion unit to the control unit.

Preferably, the second voltage comparison circuit comprises a first sampling resistor, a first current limiting resistor and a second current limiting resistor; the first sampling resistor is connected in series between a positive terminal of the power source and the first voltage comparison circuit, and a comparison voltage output from the first sampling resistor passes through the first current limiting resistor and the second current limiting resistor and then is output from the analog-to-digital conversion unit to the control unit.

The circuit for detecting the real-time resistance of the heating sheet by the voltage comparison method with the above structure has the advantages of simple structure, high precision, low cost and fast response speed.

Preferably, real-time resistance detection unit further comprises a switch module connected with the first voltage comparison circuit and the second voltage comparison circuit in series, and the switch module is electrically connected with the control unit. According to the control signal of the control unit, the working state of the switch module is changed, so that the heating sheet is not always operated in the heating state, and the protection of the heating sheet is realized.

Preferably, the switch module is a switch transistor, which has advantages of long life, safe and reliable, no mechanical wear, fast switching speed and small volume.

Preferably, the real-time resistance detection unit uses voltammetry method to detect the real-time resistance of the heating sheet.

Further, the real-time resistance detection unit includes a voltage detection unit that collects a heating sheet voltage and a current detection unit that collects a heating sheet loop current.

Further, the voltage detection unit includes a fifth voltage divider resistor and a sixth voltage divider resistor connected in series, and the fifth voltage divider resistor and the sixth voltage divider resistor connected in series are connected in parallel at both ends of the heating sheet, and the heating sheet voltage output from the connection point of the fifth voltage divider resistor and the sixth voltage divider resistor is output and passed through the analog-to-digital conversion unit to the control unit.

Further, the current detection unit includes a second sampling resistor connected in series with the heating chip and a current sampling module connected in series with the second sampling resistor, the current sampling module is configured to collect current through the second sampling resistor, and the signal is output to the analog-to-digital conversion unit and finally output to the control unit.

The real-time resistance detection unit using the above-mentioned mechanism for detecting the real-time resistance of the heating sheet by the voltammetry method has the advantages of simple structure, easy maintenance, and fast response speed.

Preferably, the heating sheet is a hollow frame structure in the middle, which reduces the current carrying area, reduces the waiting time, and effectively improves the efficiency of the heating sheet; and a tip portion is formed to hold the cigarettes.

Preferably, the heating sheet has an operating temperature in the range of 100° C. to 600° C.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The present invention will be described in detail below with reference to the accompanying drawings and preferred embodiments.

Figure 1:
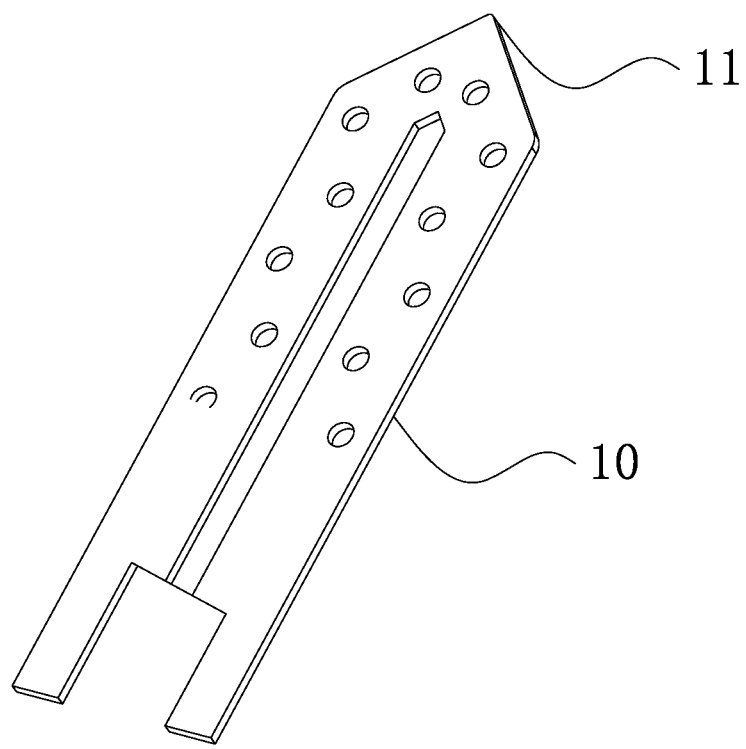
FIG. 1 is a schematic structural view of a heating sheet in a temperature controller for an electronic smoking device according to the present application.

An electronic smoking device with a metal heating sheet includes a metal heating sheet 10 as illustrated in FIG. 1 for heating a cigarette and a controller for controlling the temperature of the heating sheet 10, and the controller adjusts the temperature of the heating sheet 10 by collecting the real-time resistance of the heating sheet 10.

The heating sheet 10 is made of metal, whose real-time resistance is detected by the controller to control the temperature of the heating sheet.

The heating sheet made of metal material has the characteristics of simple structure, simple processing, strong hardness, environmental protection, and easy cleaning, based on the advantages, the present application uses the non-temperature sensing technology to accurately control the operating temperature of the heating sheet 10. The metal material is heated to have a small change in resistivity, and then the output power is controlled by a vector control algorithm to finally achieve precise temperature control. In such a way, the hardware is simple, the temperature is precise, and the stability and the reliability of the products are high. The specific principles are as follows.

For a conductor having a uniform cross-section, if the length thereof is L and the cross-sectional area is S, then the resistance of the conductor is: $R=\rho L/S$, where $\rho$ denotes the resistivity, S denotes the cross-sectional area, R denotes the resistance value, and L denotes the length of the conductor. The electrical resistivity of the conductor material is determined by the nature of the material, which varies with temperature. In the normal temperature range, the resistivity of the metal material changes linearly with temperature, and the relationship can be expressed as: $\rho=\rho0(1+\alpha t)$, where $\rho$ and $\rho0$ indicate the resistivity at t ° C. and 0° C. respectively; $\alpha$ denotes the temperature coefficient of resistivity, which is depended on materials.

Multiplying both sides of the relation by L/S, the relationship between the resistance of the metal conductor and the temperature is obtained: $R=R0(1+\alpha t)$, where R and R0 denote the resistance values at t ° C. and 0° C., respectively; $\alpha$ denotes the temperature coefficient of the resistivity. By transforming the formula, the relationship between temperature and resistance is obtained as below: $t=(R-R0)/(R0*\alpha)$. Therefore, as long as the resistance value of the metal material is known, the temperature value of the metal material can be calculated, and the temperature measured by this method is the temperature of the material itself, which has high accuracy.

The type of metal material used as the heating sheet 10 is not specifically limited in the present application. The preferred types of stainless steel materials in this embodiment are: SS304, SS316, and SS317. Compared with ceramic material, the heating sheet 10 made of metal material has very high hardness and is not easily damaged, so that it's easy to clean or remove the redundant tobacco rested on the heating sheet.

According to the principle above, the temperature can be controlled accurately by detecting the real-time resistance value of the heating sheet 10.

Figure 2:
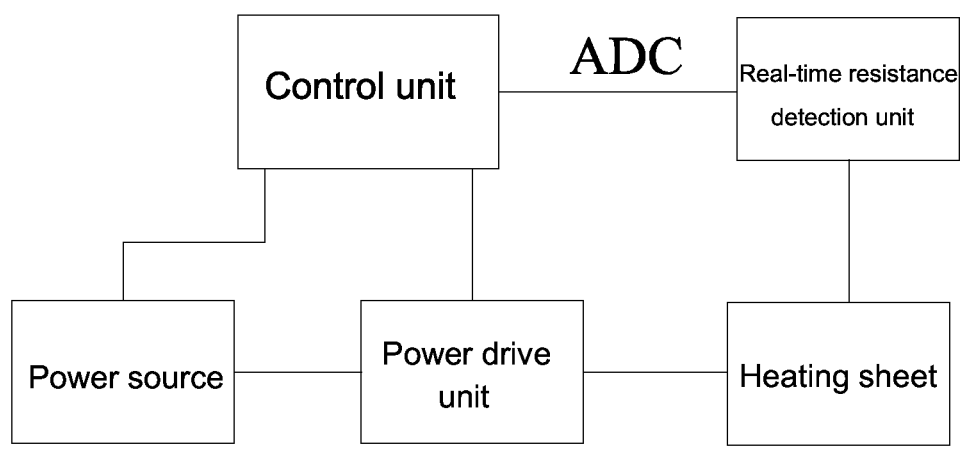
FIG. 2 is a schematic structural diagram showing the control relationship of the temperature controller of the electronic smoking device according to an embodiment of the present application.

Specifically, as shown in FIG. 2, the controller according to the present invention includes a power drive unit, a control unit, an analog-to-digital conversion unit (ADC), and a real-time resistance detection unit.

The power drive unit is electrically connected to the power source and the heating sheet 10 respectively, for converting energy of the power source into energy required for the heating sheet 10. The control unit is electrically connected to the power drive unit and the real-time resistance detection unit respectively. In this embodiment, the control unit uses an ARM Cortex-M3 core microcontroller. Of course, the model of the control unit is not limited in the present invention, other types or models of the control unit can be selected for those skilled in the art according to special considerations. The ADC is disposed between the control unit and the real-time resistance detection unit for converting an analog signal output by the real-time resistance detection unit into a digital signal recognizable by the control unit.

The real-time resistance detection unit is configured to detect the real-time resistance of the heating sheet 10, and transmit the detected value to the control unit after analog-to-digital conversion. The control unit is configured to calculate the current temperature of the heating sheet 10 by using the above-mentioned calculation formula with the real-time resistance value of the heating sheet 10, and adjust the output power of the power drive unit.

In this embodiment, the control unit adjusts the output power of the power drive unit by outputting PWM waves of different duty ratios, which has small harmonics, fast dynamic response, high power factor of the power supply, simple control circuit, low cost, and strong resistance to noise.

The real-time resistance detection unit can be realized by various achievable circuits, such as voltage comparison method and voltammetric method for detecting the real-time resistance of the heating sheet in the present invention.

Figure 3:
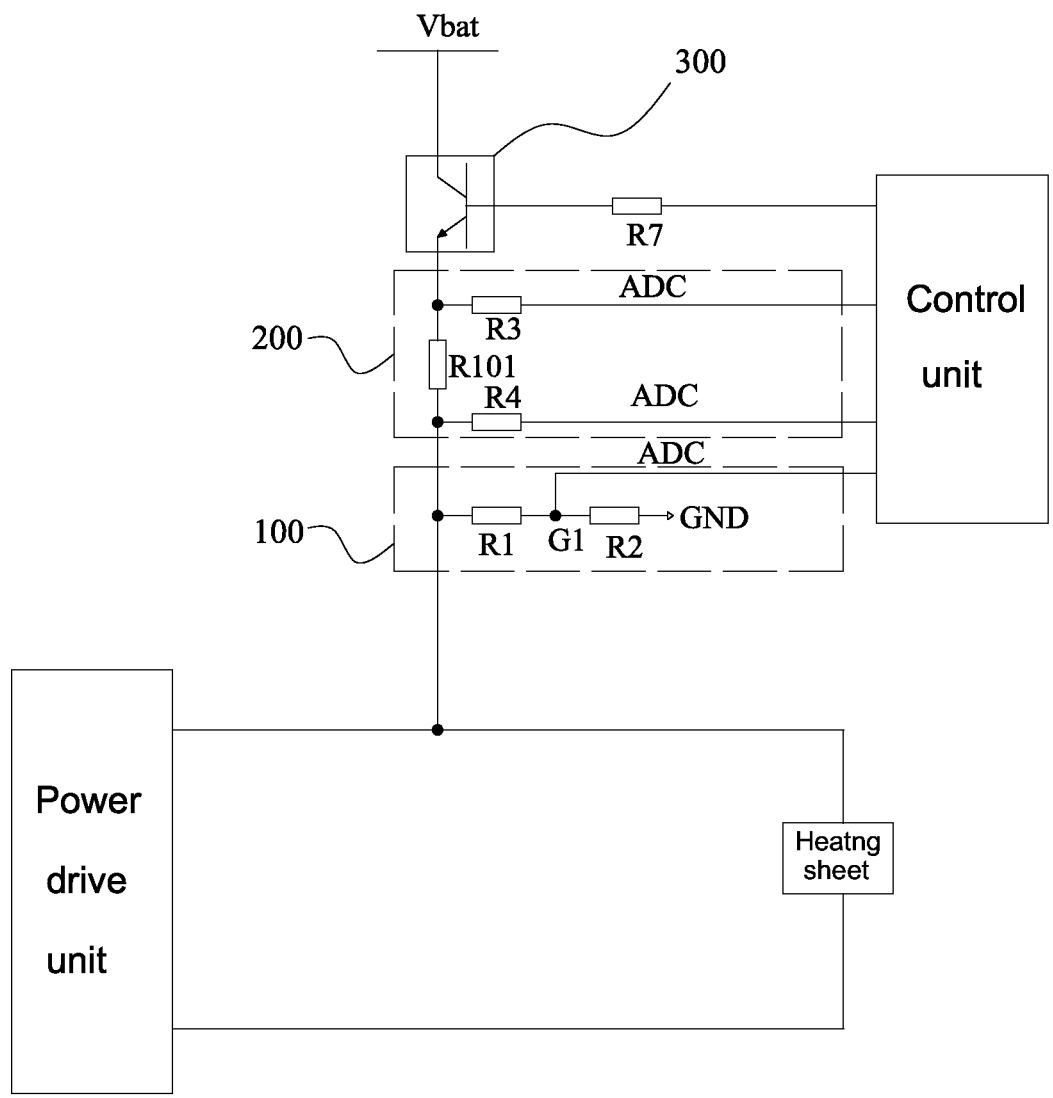
FIG. 3 is a circuit connection structure diagram for detecting a real-time resistance of a heating sheet by using the voltage comparison method of the temperature controller of the electronic smoking device according to an embodiment of the present application.

Specifically, as shown in FIG. 3, the circuit structure for detecting the real-time resistance of the heating sheet by the voltage comparison method includes a first voltage comparison circuit 100 and a second voltage comparison circuit 200 connected in series, and the first voltage comparison circuit 100 is configured to detect the voltage of the heating sheet 10, the second voltage comparison circuit 200 is configured to generate a comparison voltage that is compared with the heating sheet voltage. In such a way, by using the ratio between the heating sheet voltage and the comparison voltage, and the resistance of the comparison voltage, the real-time resistance value of the heating sheet 10 can be obtained.

The first voltage comparison circuit 100 includes a first voltage divider resistor R1 and a second voltage divider resistor R2 connected in series. After the first voltage divider resistor R1 and the second voltage divider resistor R2 are connected in series, and one end of them is grounded, and the other end is connected to the positive terminal of the heating sheet 10. The heating sheet voltage is output from the connection point G1 of the first voltage divider resistor R1 and the second voltage divider resistor R2, and is output to the control unit via the ADC.

The second voltage comparison circuit 200 includes a first sampling resistor R101, a first current limiting resistor R3 and a second current limiting resistor R4. The first sampling resistor R101 is connected between the positive terminal of the power source and the first voltage comparison circuit 100 in series. The comparison voltage output from the first sampling resistor R101 passes through the first current limiting resistor R3 the second current limiting resistor R4 respectively, and finally output to the control unit via the ADC.

The specific working process of the circuit for detecting the real-time resistance of the heating sheet 10 by the above voltage comparison method is: after the power is turned on, the divided voltage signal, namely the comparison voltage signal is transmitted from the first current limiting resistor R3 and the second current limiting resistor R4 to the ADC to perform analog-to-digital conversion, and the measured comparative voltage value signal is transmitted by the ADC to the control unit; after the first voltage divider resistor R1 and the second voltage divider resistor R2 are divided, the voltage signal of the heating sheet 10 is transmitted to the ADC to perform analog-to-digital conversion, the measured voltage value signal of the heating sheet 10 is transmitted by the ADC to the control unit; and then the resistance of the metal heating sheet 10 is calculated by the formula: $R=U*R1/U1$, where R denotes the real-time resistance of the heating sheet, and U denotes the heating sheet voltage, U1 denotes the comparison voltage, and R1 denotes the resistance of the sampling resistor.

After measuring the real-time resistance of the heating sheet 10, the real-time temperature of the heating sheet 10 can be calculated by the control unit according to the formula $t=(R-R0)/(R0*\alpha)$. When the temperature of the metal heating sheet is greater than or less than the set value, the control unit automatically adjusts the output power of the power drive unit, that is, adjusts the duty ratio of the PWM wave, thereby maintaining a constant temperature.

The circuit for detecting a real-time resistance of a heating sheet by using the above voltage comparison method further includes a switch module 300 connected in series with the first voltage comparison circuit 100 and the second voltage comparison circuit 200, and the switch module 300 is electrically with the control unit. In this embodiment, the switch module 300 is a switch transistor which is connected to the control unit through a current limiting resistor R7. After the power is turned on, the control unit outputs a high level through the current limiting resistor R7, and the transistor is turned on.

Figure 4:
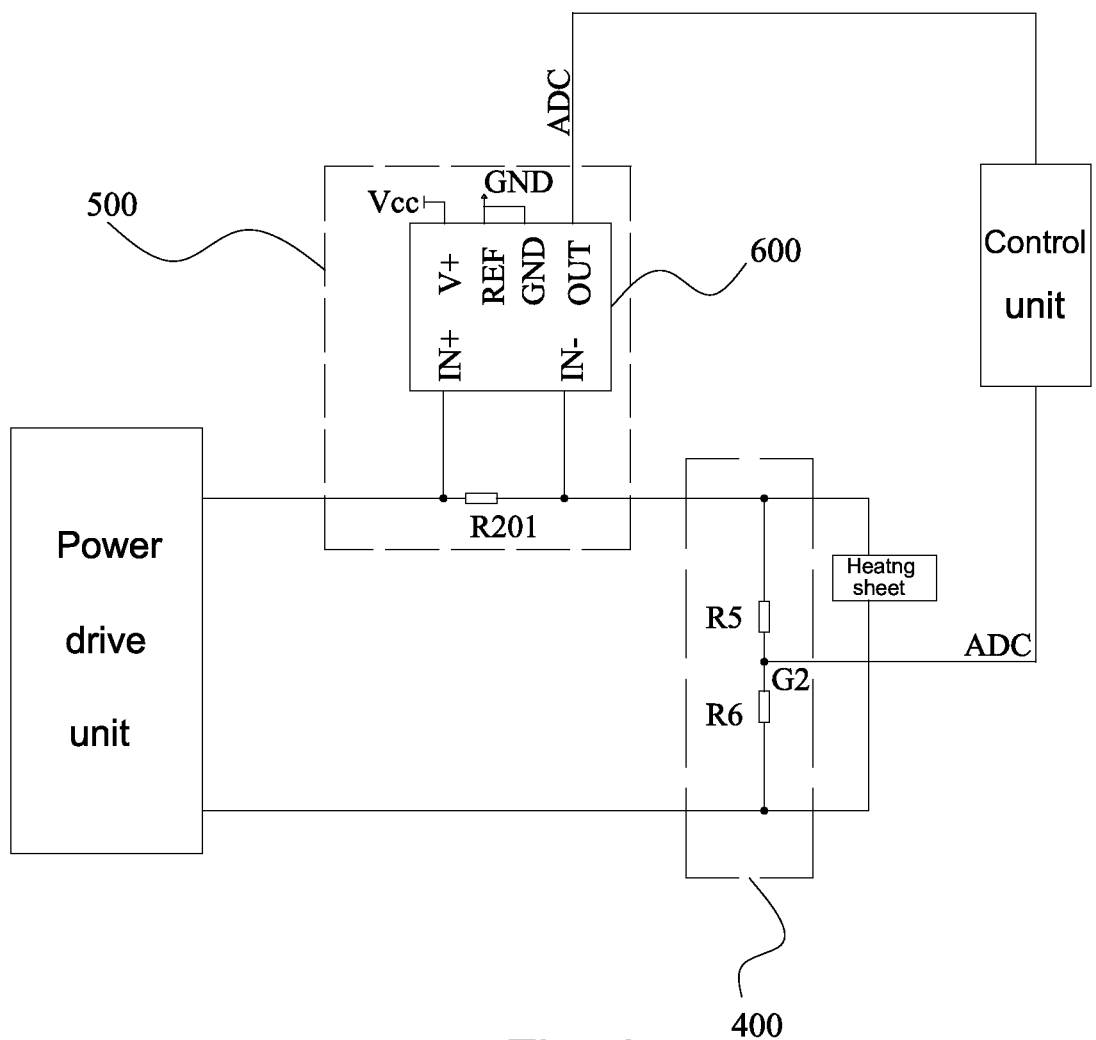
FIG. 4 is a circuit connection diagram showing the real-time resistance of the heating sheet by using the voltammetry method of the temperature controller according to an embodiment of the present application.

Referring to FIG. 4, the principle of detecting the real-time resistance of the heating sheet by using the voltammetry method is to calculate the real-time resistance of the heating sheet 10 by detecting the loop current of the heating sheet 10 and the output voltage of the heating sheet 10, and the specific circuit structure includes a voltage detection unit 400 for collecting the heating sheet voltage and a current detection unit 500 for collecting the current of the heating sheet.

The voltage detection unit 400 includes a fifth voltage divider resistor R5 and a six voltage divider resistor R6 connected in series, and the fifth voltage divider resistor R5 and the sixth voltage divider resistor R6 series connected are connected in parallel at both ends of the heating sheet 10. The heating sheet voltage is output from the connection point G2 between the fifth voltage divider resistor R5 and the sixth voltage divider resistor R6, and is supplied to the control unit via the ADC.

The current detection unit 500 includes a second sampling resistor R201 connected with the heating sheet 10 in series, and a current sampling module 600 connected to both ends of the second sampling resistor R201. The current sampling module 600 is configured to collect the current of the second sampling resistor R201 and is output to the control unit via the analog-to-digital conversion unit. The current sampling module 600 in this embodiment adopts a current sampling IC, and it's easy to construct the circuit, and is convenient to maintain.

The above-mentioned sampling voltammetry method for timely detecting the resistance of the heating sheet follows. After the voltage is divided by the fifth voltage divider resistor R5 and the sixth voltage divider resistor R6, the output voltage signal of the heating sheet 10 is sent to the ADC for analog-to-digital conversion, and then transmitted to the control unit to obtain the voltage value of the heating sheet 10. A loop current signal of the heating sheet 10 is detected by the current sampling module 600 and the second sampling resistor R201, which is then subjected to analog-to-digital conversion by the ADC and finally transmitted to the control unit to obtain a loop current value of the heating sheet 10. Then, the resistance of the metal heating sheet 10 is calculated by the formula: $R=U/I$, where U denotes the metal heating sheet voltage, and I denotes the current flowing through the metal heating sheet 10.

The temperature control of the heating sheet 10 can be performed after the real-time resistance value of the heating sheet 10 is detected, whose specific temperature control principle process has been explained in detail in the embodiment of the resistance detection using the voltage comparison method, and will not be described here.

In order to improve the control precision, the precision of the resistor used in the circuit of the present application is within ±1%, that is, the precisions of the first voltage divider resistor R1, the second voltage divider resistor R2, the first current limiting resistor R3, and the second current limiting resistor R4, the fifth voltage divider resistor R5, the sixth voltage divider resistor R6, the first sampling resistor R101, and the second sampling resistor R201 are all controlled within ±1%.

In the present invention, the operating temperature of the heating sheet 10 ranges from 100° C. to 600° C., by which the consumer can adjust the corresponding temperature according to different tastes.

Referring to FIG. 1 again, since the heating sheet 10 is made of metal material, in order to improve the efficiency of the heating sheet 10 and shorten the waiting time, the heating sheet 10 has a middle that is hollow frame and a tip end 11, such that the cigarette can be inserted on the tip when used, which is convenient to hold.

What is claimed is:

1. A temperature controller for electronic smoking device, comprising a metal heating sheet for heating a cigarette and a controller for controlling temperature of the heating sheet by collecting a real-time resistance of the heating sheet, the controller comprising a power drive unit, an analog-to-digital conversion unit, a control unit and a real-time resistance detection unit;

wherein the power drive unit is electrically connected to a power source and the heating sheet respectively, the control unit is electrically connected to the power drive unit and the real-time resistance detection unit respectively, and the analog-to-digital conversion unit is configured to convert an analog signal output by the real-time resistance detection unit into a digital signal that is transmitted to the control unit;

the real-time resistance detection unit is configured to detect a real-time resistance of the heating sheet, and the control unit is configured to adjust an output power of the power drive unit according to the real-time resistance of the heating sheet; the real-time resistance detection unit comprises a first voltage comparison circuit for detecting a heater sheet voltage, and a second voltage comparison circuit that is connected with the first voltage comparison circuit in series for generating a comparison voltage that is compared with the heater sheet voltage; the first voltage comparison circuit comprises a first voltage divider resistor and a second voltage divider resistor connected in series, one end of the first voltage divider resistor and the second voltage divider resistor is grounded, and the other end is connected to a positive terminal of the heating sheet, the heater sheet voltage is output from a connection junction of the first voltage divider resistor and the second voltage divider resistor, and then is output from the analog-to-digital conversion unit to the control unit; the second voltage comparison circuit comprises a first sampling resistor, a first current limiting resistor and a second current limiting resistor; the first sampling resistor is connected in series between a positive terminal of the power source and the first voltage comparison circuit, and a comparison voltage output from the first sampling resistor passes through the first current limiting resistor and the second current limiting resistor and then is output from the analog-to-digital conversion unit to the control unit.

2. The temperature controller for electronic smoking device according to claim 1, wherein the control unit is configured to adjust the output power of the power drive unit by outputting pulse width modulated waves with different duty ratios.

3. The temperature controller for electronic smoking device according to claim 1, wherein real-time resistance detection unit further comprises a switch module connected with the first voltage comparison circuit and the second voltage comparison circuit in series, and the switch module is electrically connected with the control unit.

4. The temperature controller for electronic smoking device according to claim 3, wherein the switch module is a switch transistor.

5. The temperature controller for electronic smoking device according to claim 1, wherein the heating sheet has a middle that is hollow frame and a tip end.

6. The temperature controller for electronic smoking device according to claim 1, wherein the heating sheet is configured to be operated under a temperature ranging from 100° C. to 600° C.

* * * * *